US010608745B2

(12) United States Patent
Shulman et al.

(10) Patent No.: US 10,608,745 B2
(45) Date of Patent: Mar. 31, 2020

(54) DOCSIS OVER PASSIVE OPTICAL NETWORK

(71) Applicant: Intel Corporation, Santa Clara, CA (US)

(72) Inventors: Shaul Shulman, Ramat Gan (IL); Guy Ray, Kiryat Ono (IL); Amos Klimker, Jerusalem (IL); Avi Priev, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/328,408

(22) PCT Filed: Nov. 28, 2016

(86) PCT No.: PCT/US2016/063844
§ 371 (c)(1),
(2) Date: Feb. 26, 2019

(87) PCT Pub. No.: WO2018/063421
PCT Pub. Date: Apr. 5, 2018

(65) Prior Publication Data
US 2019/0215071 A1    Jul. 11, 2019

Related U.S. Application Data

(60) Provisional application No. 62/401,347, filed on Sep. 29, 2016.

(51) Int. Cl.
*H04B 10/27* (2013.01)
*H04Q 11/00* (2006.01)
(Continued)

(52) U.S. Cl.
CPC ......... *H04B 10/27* (2013.01); *H04L 12/2801* (2013.01); *H04L 12/2856* (2013.01); *H04Q 11/0067* (2013.01); *H04B 10/25* (2013.01)

(58) Field of Classification Search
CPC ..... H04B 10/27; H04B 10/25; H04L 12/2801; H04L 12/2856; H04Q 11/0067
(Continued)

(56) References Cited

U.S. PATENT DOCUMENTS 8,831,425 B1    9/2014 Bernstein et al.
9,749,049 B2 *  8/2017 Wu ..................... H04Q 11/0067
(Continued)

OTHER PUBLICATIONS

International Search Report and Written Opinion dated Jul. 14, 2017 for PCT Application PCT/US2016/063844.
(Continued)

*Primary Examiner* — Dalzid E Singh
(74) *Attorney, Agent, or Firm* — Eschweiler & Potashnik, LLC

(57) ABSTRACT

A system that utilizes data over cable service interface specification (DOCSIS) over passive optical networks is disclosed. An example system includes core system in a passive optical network (PON), comprising a memory; and one or more processors configured to generate a downlink (DL) data stream comprising optical signals, in compliance with a data over cable service interface specification (DOCSIS); and provide the optical signals containing DL data to a network component in the PON over an optical fiber coupled between the core system and the network component. In some embodiments, the core system is located at a head end equipment at the internet service provider's facility. However, in other embodiments, the core system can have a distributed architecture, with a part of the core system located at the internet service provider's facility and a different part of the core system located at a different location.

6 Claims, 11 Drawing Sheets

(51) Int. Cl.
*H04B 10/25* (2013.01)
*H04L 12/28* (2006.01)

(58) Field of Classification Search
USPC .......................................................... 398/140
See application file for complete search history.

(56) References Cited

U.S. PATENT DOCUMENTS

| | | |
|---|---|---|
| 2005/0175035 A1 | 8/2005 | Neely et al. |
| 2008/0310842 A1* | 12/2008 | Skrobko .......... H04B 10/25753 |
| | | 398/72 |
| 2011/0078755 A1* | 3/2011 | Dai ...................... H04H 20/69 |
| | | 725/111 |
| 2014/0079060 A1* | 3/2014 | Healy .................... H04N 21/23 |
| | | 370/392 |
| 2014/0079102 A1* | 3/2014 | Kliger .................. H04L 5/0046 |
| | | 375/222 |
| 2014/0199080 A1* | 7/2014 | Ramesh ................ H04B 10/40 |
| | | 398/116 |
| 2016/0211983 A1* | 7/2016 | Zhang ................ H04Q 11/0067 |
| 2018/0131582 A1* | 5/2018 | Schnitzer ............ H04L 12/2861 |

OTHER PUBLICATIONS

"Data Over Cable Service Interface Specifications DOCSIS 3.0, Physical Layer Specification, CM-SP-PHYv3.0-I08-090121." CableLabs. Jan. 21, 2009. 169 pages.

* cited by examiner

DOCSIS OVER PASSIVE OPTICAL NETWORK

REFERENCE TO RELATED APPLICATIONS

This application is a National Phase entry application of International Patent Application No. PCT/US2016/063844 filed Nov. 28, 2016, which claims priority to provisional Application No. 62/401,347 filed Sep. 29, 2016, entitled "DOCSIS OVER PASSIVE OPTICAL NETWORK" and is hereby incorporated by reference in their entirety.

FIELD

The present disclosure relates to the field of passive optical networks (PON) and in particular to methods and apparatus for utilizing data over cable service interface specification (DOCSIS) over passive optical networks.

BACKGROUND

The Cable multiple system operators (MSOs) access networks are going through two revolutionary transition processes. Process number one is the transition from centralized headend equipment to distributed architecture, with a physical layer device at a street node and the rest of headend equipment virtualized in the operator network. Process number two is the transition of the cable (e.g., coax cable) operators to Fiber to the Home (FTTH) or passive optical networks (PON). Current implementations of coaxial (coax) networks utilize DOCSIS for layer 2 and upper layer processing. As part of a move towards the distributed access architectures and Network Function Virtualization (NFV) based headend, the cable operators have developed a "remote PHY" standard in coax networks that allows relocating the coax specific PHY to the street node and keeping the DOCSIS layer 2 and higher layers processing in the headend, which, when virtualized, can run on a completely off-the-shelf, standard platform. To offer the fiber service, the cable operators are using Ethernet passive optical network (EPON) as layer 2 in the current implementations of PON. However, there is no "remote PON PHY" standard defined for PON that enables to realize a distributed architecture for PON.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
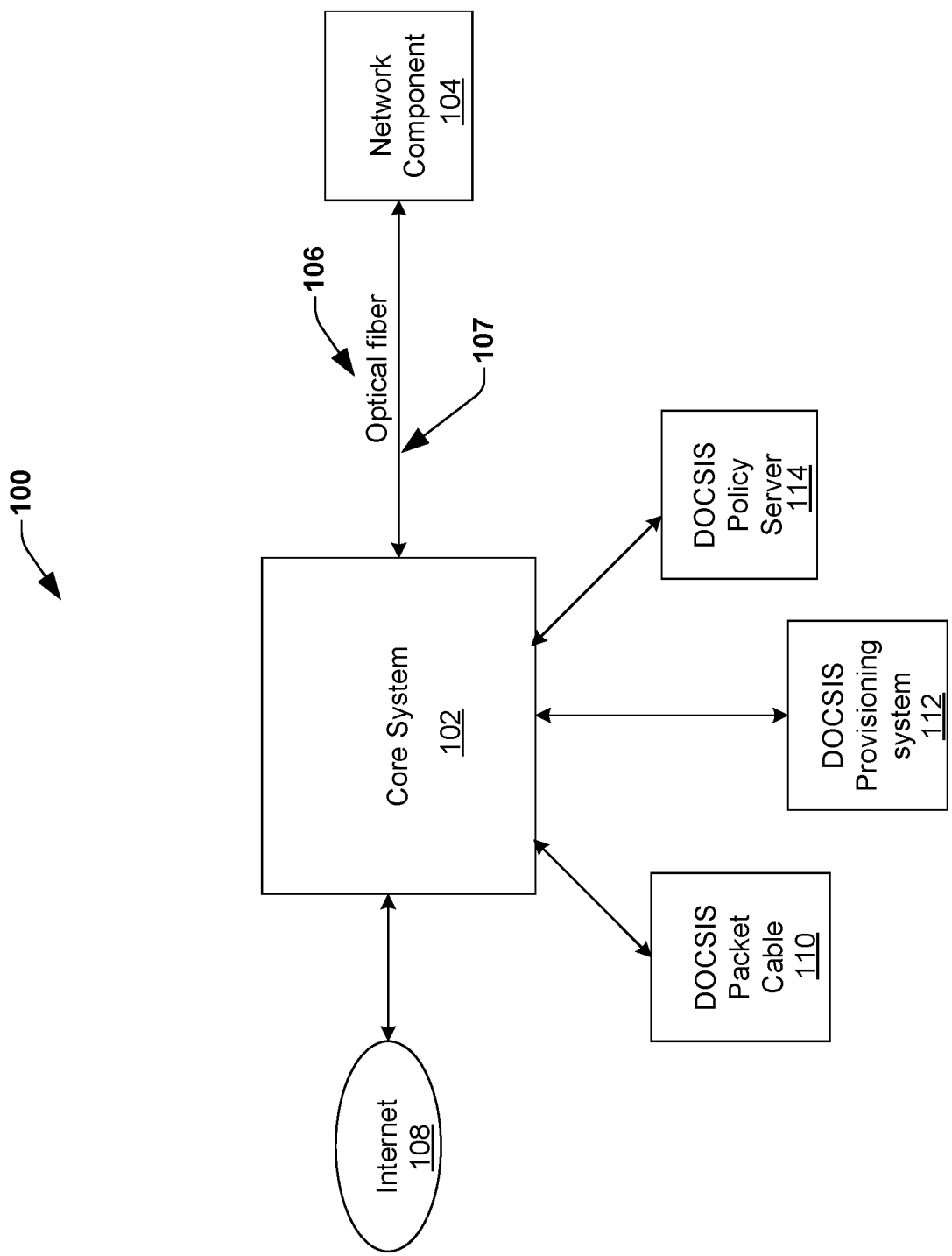
FIG. 1 illustrates a passive optical network, according to one embodiment of the disclosure.

In one embodiment of the disclosure, a core system in a passive optical network (PON), comprising a memory and one or more processors is disclosed. The one or more processors is configured to generate a downlink (DL) data stream comprising optical signals, in compliance with a data over cable service interface specification (DOCSIS); and provide the optical signals containing DL data to a network component in the PON over an optical fiber coupled between the core system and the network component.

In one embodiment of the disclosure, a passive optical network (PON) component in a passive optical network (PON), comprising a memory; and one or more processors is disclosed. The one or more processors is configured to process a downlink (DL) data stream comprising data over cable service interface specification (DOCSIS) data packets comprising DL data, received from a core component in the PON, over an interface between the PON component and the core component, generate an optical signal comprising the DL data based on the received DOCSIS data packets; and provide the generated optical signal comprising the DL data to a network component in the PON over an optical fiber coupled between the PON component and the network component.

In one embodiment of the disclosure, a network component in a passive optical network (PON), comprising a memory; and one or more processors is disclosed. The one or more processors is configured to receive a downlink (DL) data stream comprising an optical signal comprising a DL data over an optical fiber, from a core component or a component associated therewith in the PON, convert the received optical signal comprising the DL data into data over cable service interface specification (DOCSIS) data packets, utilizing PON standards; and process the DOCSIS data packets in compliance with DOCSIS.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the Fiber to the Home (FTTH) or passive optical networks (PON) do not have a "remote PON PHY" standard that allows relocating PON specific PHY (physical layer processing) to the street node, in existence. All current solutions for PON use existing PON layer 2 (e.g., EPON, GPON etc.). Currently no standards are defined that separate the PON layer 2 functions and the PON PHY functions in passive optical networks. This limits the architecture of delivering FTTH service for Cable operators down to two options. That is, either placing entire PON optical line terminal (OLT) that includes physical layer and upper layer processing, in the street node, which is highly inefficient, or having the entire PON OLT situated at the headend, which then makes the headend equipment non-standard ("standard" being a compute platform with Ethernet interface). Therefore, in order to enable keeping the platform in the Headend standard and virtualize the MAC and upper layer processing for PON, an apparatus and a method that utilizes DOCSIS over PON is proposed in this disclosure. The idea is to use DOCSIS as Layer 2 (and higher) for passive optical networks instead of EPON or GPON or other PON layer technology known today.

DOCSIS is the "native" layer 2 in coax networks. DOCSIS was developed for cable operators, incorporating over the years of its development the specific needs of the type of high speed data, video and voice services that cable operators provide. The architecture proposed herein makes possible using the standard DOCSIS MAC and Upper Layers (MULPI) over fiber, without the need to introduce non-cable native technologies like EPON, which require adaptation for cable service provisioning in the form of, for example, DOCSIS provisioning over EPON (DPoE). With DOCSIS as the MULPI layer, the "remote PHY" (a CableLabs standard for tunneling DOCSIS MAC-PHY interface over Ethernet) specification can be used for both coax based service groups and PON based service groups. In some embodiments, the DOCSIS 3.1 MULPI will be simplified and augmented to run over fiber.

In some embodiments, utilizing DOCSIS as MULPI layer in PON facilitates the PON to have a distributed architecture with DOCSIS MAC layer and higher layer processing at headend and PON specific PHY (i.e., physical layer processing) at a street node. In some embodiments, reusing DOCSIS layer 2 for PON enables customers to utilize the benefits of DOCSIS, such as, automatic upgrades. In some embodiments, utilizing DOCSIS over PON eliminates the existing extra complexity, overhead, implementation and maintenance cost for extending DOCSIS services over existing PON technologies like EPON.

Various embodiments described herein facilitate to utilize data over cable service interface specification (DOCSIS) over passive optical networks (PON). In particular, in one embodiment, a PON having a core system comprising a core component at a headend equipment that facilitates to utilize DOCSIS over PON, is disclosed. In such embodiments, the core component handles layer 2 processing associated with a data in compliance with DOCSIS and layer 1 processing associated with the data in accordance with PON standards. In some embodiments, PON standards comprises standards utilized in current implementations of passive optical networks (PON). Alternately, in other embodiments, the PON standards can comprise any standards utilized in processing optical signals. In another embodiment, a PON having a core system comprising a core component at a headend equipment and a PON component at a street node that facilitates to utilize DOCSIS over PON, is disclosed. In such embodiments, the core component handles layer 2 processing associated with a data in compliance with DOCSIS and the PON component handles the layer 1 processing associated with the data in accordance with PON standards.

FIG. 1 illustrates a passive optical network (PON) 100, according to one embodiment of the disclosure. In some embodiments, the PON 100 enables to provide network edge connectivity from an internet service provider to an end user (i.e., a customer). The PON 100 includes a core system 102 and a network component 104 coupled to one another by means of a transmission component 106. In some embodiments, the transmission component 106 comprises an optical fiber. In some embodiments, the PON 100 can comprise a plurality of network components coupled to the core system 102. In such embodiments, the PON 100 implements a point to multipoint architecture, in which unpowered fiber optic splitters are utilized to enable a single optical fiber to serve the multiple network components. In some embodiments, the core system 102 and the network component 104 are capable of handling both downlink (DL) and uplink (UL) data transmission. In some embodiments, the core system 102 is located at a head end equipment at the internet service provider's facility. However, in other embodiments, the core system 102 can have a distributed architecture, with a part of the core system 102 located at the internet service provider's facility and a part of the core system 102 located at a different location (e.g., closer to the customer). In some embodiments, the network component 104 is located at the customer's premises.

In some embodiments, the core system 102 comprises a memory (not shown) and one or more processors (not shown) configured to generate a downlink (DL) data stream comprising optical signals 107 and provide the optical signals 107 containing DL data to the network component 104, during DL data transmission. The optical signals 107 are provided to the network component 104 over the optical fiber 106 coupled between the core system 102 and the network component 104. In some embodiments, the optical signals 107 are generated at the core system 102 in compliance with data over cable service interface specification (DOCSIS). In particular, in some embodiments, the core system 102 is configured to perform network functions comprising media access control (MAC) and upper layer processing associated with the DL data in compliance with DOCSIS and perform network functions comprising physical layer processing (e.g., modulation) associated with the DL data using PON standards. For example, in some embodiments, the core system 102 is configured to generate DOCSIS data packets comprising the DL data in compliance with DOCSIS and convert the DOCSIS data packets into optical signals for transmission over the optical fiber 106, in accordance with PON standards. In some embodiments, converting the DOCSIS data packets into optical signals comprises digital modulation comprising converting the DOCSIS data packets into digital bits for transmission over the optical fiber 106. In some embodiments, the core system 102 utilizes DOCSIS packet cable 110, DOCSIS provisioning system 112 and DOCSIS policy server 114 to perform media access control and upper layer processing associated with the DL data. In some embodiments, the DOCSIS MAC and the upper layer DOCSIS protocols includes all signaling functions, downstream and upstream bandwidth scheduling, and DOCSIS framing.

The network component 104 comprises a memory (not shown) and one or more processors (not shown) configured to receive the optical signals 107 from the core system 102 over the optical fiber 106 and process the received optical signals 107 in compliance with DOCSIS. In particular, the network component 104 is configured to convert (e.g., demodulate), via the one or more processors, the optical signals 107 into DOCSIS data packets and process the DOCSIS data packets in compliance with DOCSIS. That is, the network component 104 utilizes standard PON technologies for physical layer processing (e.g., demodulation) and DOCSIS for layer 2 (or upper layers) processing. In other words, the network component 104 has DOCSIS layer 2 and PON layer 1. In some embodiments, the network component 104 replaces cable modems in coax networks. In some embodiments, the network component 104 in the PON 100 is similar to a cable modem in coax networks, with the physical layer processing in the cable modem replaced by PON specific PHY.

During UL data transmission, the network component 104 is configured to generate an UL data stream comprising optical signals and provide the optical signals containing UL data to the core system 102, over the optical fiber 106 coupled between the core system 102 and the network component 104. In such embodiments, the optical signal comprising the UL data are generated at the network component 104 in compliance with data over cable service interface specification (DOCSIS). In particular, in some embodiments, the network component 104 is configured to perform network functions comprising physical layer processing (e.g., modulation) associated with the UL data using PON standards and perform network functions comprising media access control and upper layer processing associated with the UL data in compliance with DOCSIS. For example, in some embodiments, the network component 104 is configured to generate DOCSIS data packets comprising the UL data in compliance with DOCSIS and convert the DOCSIS data packets into optical signals for transmission over the optical fiber 106, in accordance with PON standards.

Further, during the UL data transmission, the core system 102 is configured to receive the optical signal comprising the UL data stream from the network component 104, over the optical fiber 106. In such embodiments, the core system 102 is configured to convert (e.g., demodulate), via the one or more processors, the optical signal comprising the UL data into DOCSIS data packets and process the DOCSIS data packets in compliance with DOCSIS. That is, the core system 102 utilizes standard PON technologies for physical layer processing (e.g., demodulation) and DOCSIS for layer 2 (or upper layers) processing.

Figure 2:
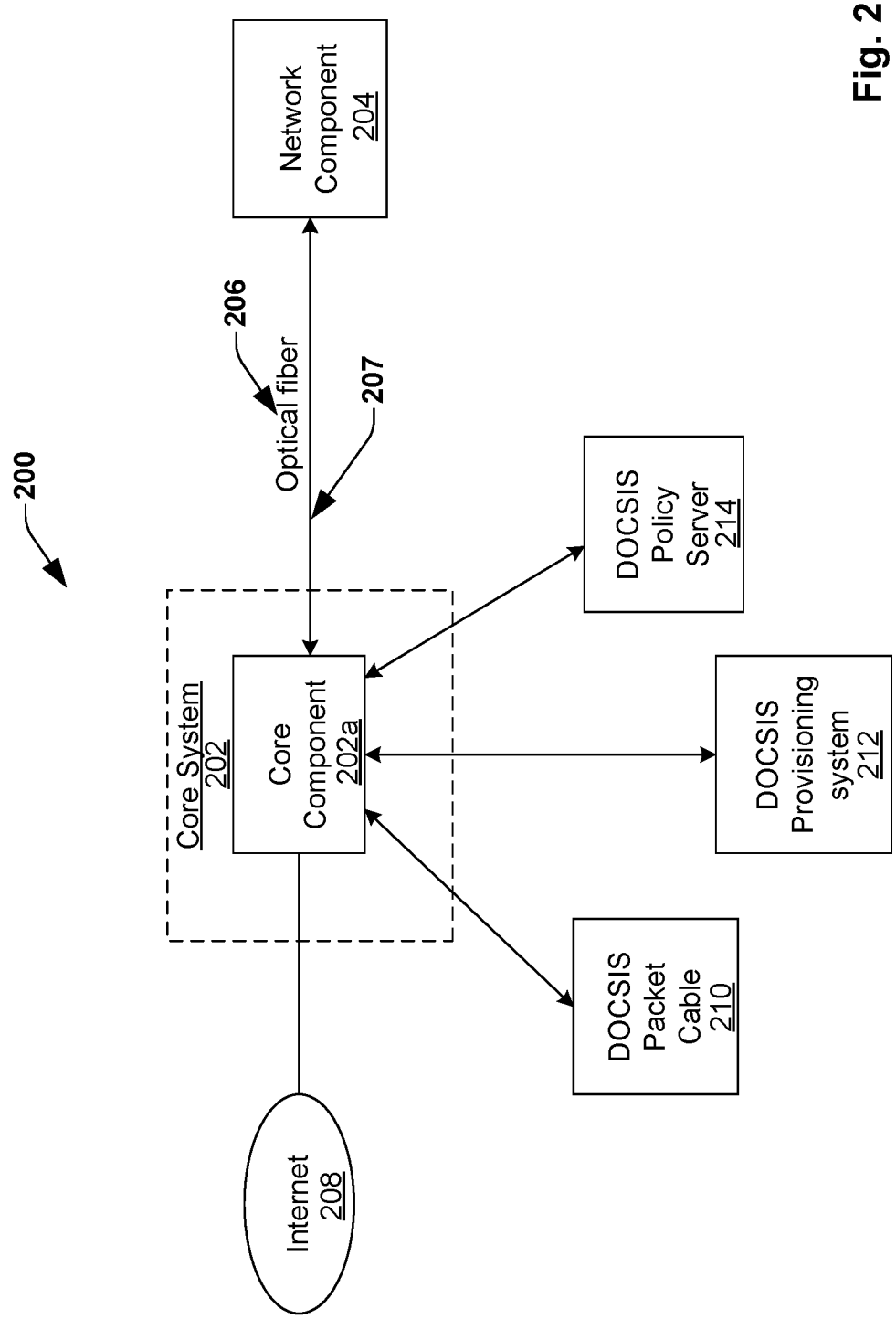
FIG. 2 illustrates an architecture of a passive optical network utilizing DOCSIS, according to one embodiment of the disclosure.

FIG. 2 illustrates an architecture of a passive optical network (PON) 200, according to one embodiment of the disclosure. In some embodiments, the PON 200 enables to provide network edge connectivity from an internet service provider to an end user (i.e., a customer). In some embodiments, the PON 200 is similar to the PON 100 in FIG. 1 and enables to utilize DOCSIS over PON. The PON 200 includes a core system 202 and a network component 204 coupled to one another by means of a transmission component 206. In some embodiments, the transmission component 206 comprises an optical fiber. In some embodiments, the core system 202 comprises a core component 202a comprising a memory and one or more processors configured to perform all the functions of the core system 102 described above with respect to FIG. 1 above. In some embodiments, the core component 202a is located at a head end equipment at the internet service provider's facility and the network component 204 is located at customer's premises. In some embodiments, the core component 202a and the network component 204 are capable of handling both downlink (DL) and uplink (UL) data transmission.

During DL data transmission, the core component 202a is configured to generate a downlink (DL) data stream comprising optical signals 207 and provide the optical signals 207 containing DL data to the network component 204, over the optical fiber 206 coupled between the core component 202a and the network component 204. In such embodiments, the core component 202a is configured to perform network functions comprising the media access control and upper layer processing associated with the DL data in compliance with DOCSIS and perform network functions comprising the physical layer processing (e.g., modulation) associated with the DL data using PON standards. For example, in some embodiments, the core component 202a is configured to generate DOCSIS data packets comprising the DL data in compliance with DOCSIS and convert the DOCSIS data packets into optical signals, for example, the optical signal 207, for transmission over the optical fiber 206, in accordance with PON standards. In such embodiments, the core component 202a handles both the physical layer (layer 1) processing and the upper layer (layer 2 and upper layers) processing of the DL data. In some embodiments, the core component 202a utilizes DOCSIS packet cable 210, DOCSIS provisioning system 212 and DOCSIS policy server 214 to perform media access control and upper layer processing associated with the DL data.

The network component 204 comprises a memory (not shown) and one or more processors (not shown) configured to receive the optical signal 207 comprising the DL data from the core component 202a over the optical fiber 206 and process the received optical signal 207 in compliance with DOCSIS, during DL transmission. In some embodiments, the network component 204 utilizes standard PON technologies to perform network functions comprising physical layer processing (e.g., demodulation) associated with the DL data and DOCSIS to perform network functions comprising layer 2 (or upper layers) processing associated with the DL data. For example, in some embodiments, the network component 204 is configured to convert (e.g., demodulate), via the one or more processors, the optical signal 207 into DOCSIS data packets in accordance with PON standards and process the DOCSIS data packets in compliance with DOCSIS.

During UL data transmission, the network component 204 is configured to generate an UL data stream comprising optical signals and provide the optical signals containing UL data to the core component 202a, over the optical fiber 206 coupled between the core component 202a and the network component 204. In such embodiments, the optical signal comprising the UL data are generated at the network component 204 in compliance with data over cable service interface specification (DOCSIS). In particular, in some embodiments, the network component 204 is configured to perform network functions comprising physical layer processing (e.g., modulation) associated with the UL data using PON standards and perform network functions comprising media access control and upper layer processing associated with the UL data in compliance with DOCSIS. For example, in some embodiments, the network component 204 is configured to generate DOCSIS data packets comprising the UL data in compliance with DOCSIS and convert the DOCSIS data packets into optical signals for transmission over the optical fiber 206, in accordance with PON standards.

Further, during the UL data transmission, the core component 202a is configured to receive the optical signal comprising the UL data from the network component 204, over the optical fiber 206. In such embodiments, the core component 202a is configured to convert (e.g., demodulate), via the one or more processors, the optical signal comprising the UL data into DOCSIS data packets utilizing PON standards and process the DOCSIS data packets in compliance with DOCSIS. That is, the core component 202a utilizes standard PON technologies to perform network functions comprising physical layer processing (e.g., demodulation) associated with the UL data and DOCSIS to perform network functions comprising layer 2 (or upper layers) processing associated with the UL data.

Figure 3:
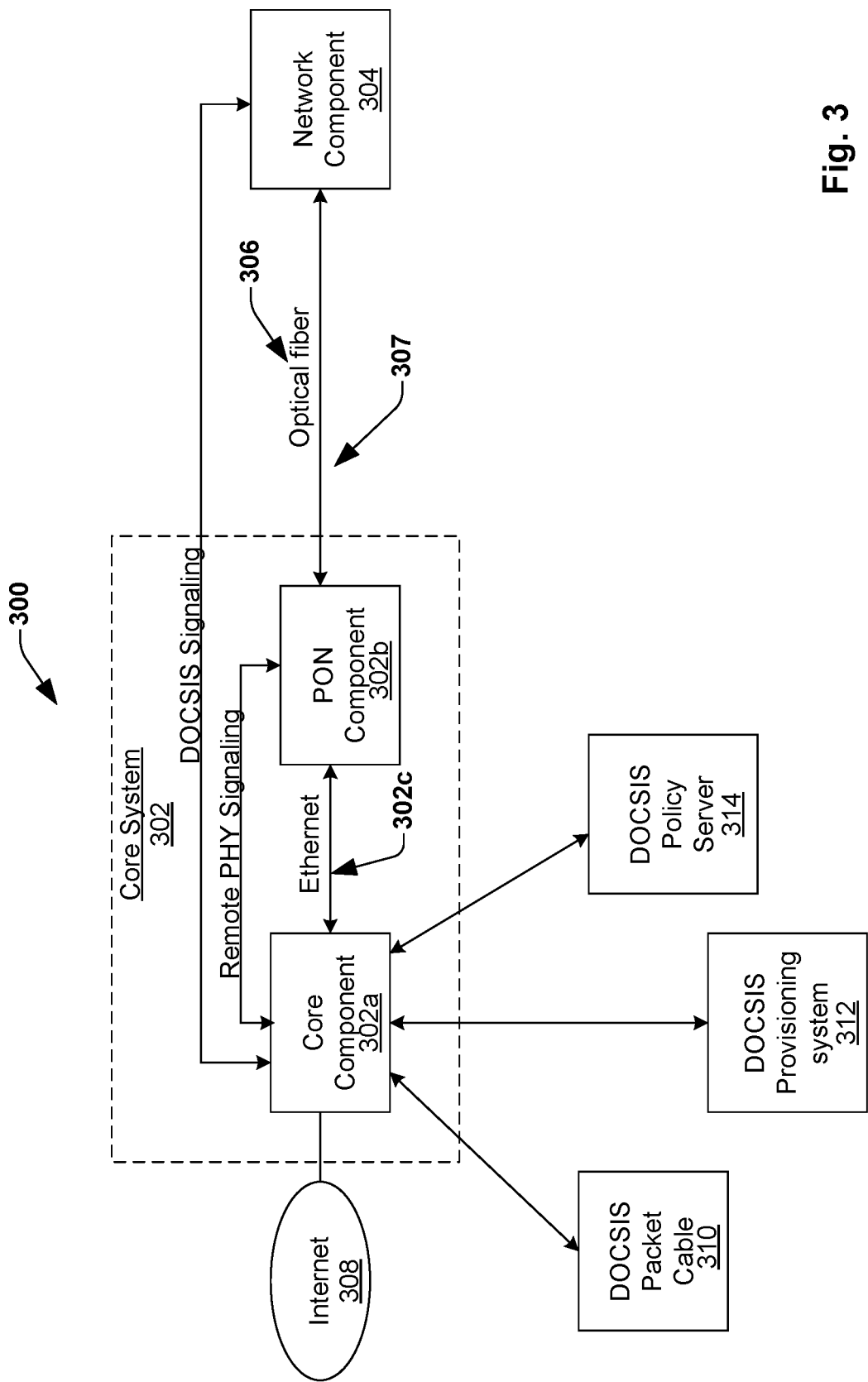
FIG. 3 illustrates an architecture of a passive optical network utilizing DOCSIS, according to another embodiment of the disclosure.

FIG. 3 illustrates an architecture of a passive optical network (PON) 300, according to another embodiment of the disclosure. In some embodiments, the PON 300 enables to provide network edge connectivity from an internet service provider to an end user (i.e., a customer). In some embodiments, the PON 300 is similar to the PON 100 in FIG. 1 and enables to utilize DOCSIS over PON. The PON 300 includes a core system 302 and a network component 304 coupled to one another by means of a transmission component 306. In some embodiments, the transmission component 306 comprises an optical fiber. In some embodiments, the core system 302 comprises a memory and one or more processors configured to perform all the functions of the core system 102 described above with respect to FIG. 1 above. In some embodiments, the core system 302 comprises a core component 302a and a PON component 302b, and the memory and the one or more processors of the core system 302 are distributed between the core component 302a and the PON component 302b.

In some embodiments, the core component 302a is located at a headend equipment at the internet service provider's facility and the PON component 302b is located at a street node. In some embodiments, the street node is different from the internet service provider's facility and comprises a location closer to customer's premises. However, in other embodiments, the PON component 302b can be located at other locations, for example, at the internet service provider's facility or any other location within the PON 300. In some embodiments, the core component 302a is configured to perform network functions comprising MAC and upper layer processing associated with a data in compliance with DOCSIS and the PON component 302b is configured to perform network functions comprising physical layer processing associated with the data in accordance with PON standards. In some embodiments, utilizing DOCSIS to perform MAC and upper layer processing at the core system 302, enables to relocate the physical layer processing to the PON component 302b.

The core system 302 further comprises an interface 302c between the core component 302a and the PON component 302b. In some embodiments, the interface comprises an Ethernet interface and is configured to transfer data packets between the core component 302a and the PON component 302b, via tunneling. In some embodiments, an existing "remote PHY" specification, for example, a CableLabs standard for tunneling DOCSIS MAC-PHY interface over Ethernet, is utilized for the communication between the core component 302a and the PON component 302b over the Ethernet interface 302c. In some embodiments, relocating the physical layer processing to the PON component further enables to implement a network function virtualization (NFV) based core component 302a at the headend equipment. That is, in such embodiments, the network functions associated with the core component 302a can be virtualized and therefore enables the core component to be implemented on a completely off-the-shelf, standard platform, rather than a PON specific platform at the headend in current PON implementations. In some embodiments, the core system 302 and the network component 304 are capable of handling both downlink (DL) and uplink (UL) data transmission.

During DL data transmission, the core component 302a is configured to perform network functions comprising MAC and upper layer processing associated with the DL data in compliance with DOCSIS. For example, in some embodiments, the core component 302a is configured to generate DOCSIS data packets comprising the DL data and provide the generated DOCSIS data packets to the PON component 302b over the Ethernet interface 302c. In some embodiments, the core component 302a utilizes DOCSIS packet cable 310, DOCSIS provisioning system 312 and DOCSIS policy server 314 to perform media access control and upper layer processing associated with the DL data. The PON component 302b is configured to receive the DOCSIS data packets from the core component 302a and perform network functions comprising physical layer processing (e.g., modulation) associated with the DL data using PON standards. For example, in some embodiments, the PON component 302b is configured to convert the DOCSIS data packets into optical signals, for example, the optical signal 307, for transmission over the optical fiber 306, in accordance with PON standards.

The network component 304 comprises a memory (not shown) and one or more processors (not shown) configured to receive the optical signal 307 from the PON component 302b over the optical fiber 306 and process the received optical signal 307 in compliance with DOCSIS. In particular, the network component 304 is configured to convert (e.g., demodulate), via the one or more processors, the optical signal 307 into DOCSIS data packets and process the DOCSIS data packets in compliance with DOCSIS. That is, the network component 304 utilizes standard PON technologies for physical layer processing (e.g., demodulation) and DOCSIS for layer 2 (or upper layers) processing. In other words, the network component 204 has DOCSIS layer 2 and PON layer 1. In some embodiments, the network component 304 replaces cable modems in coax networks. In some embodiments, the network component 304 in the PON 300 is similar to a cable modem in coax networks, with the physical layer processing in the cable modem replaced by PON specific PHY.

During UL data transmission, the network component 304 is configured to generate an UL data stream comprising optical signals and provide the optical signals containing UL data to the PON component 302b, over the optical fiber 306 coupled between the PON component 302b and the network component 304. In such embodiments, the optical signal comprising the UL data is generated at the network component 304 in compliance with data over cable service interface specification (DOCSIS). In particular, in some embodiments, the network component 304 is configured to perform network functions comprising media access control and upper layer processing associated with the UL data in compliance with DOCSIS and perform network functions comprising physical layer processing (e.g., modulation) associated with the UL data using PON standards. For example, in some embodiments, the network component 304 is configured to generate DOCSIS data packets comprising the UL data in compliance with DOCSIS and convert the DOCSIS data packets into optical signals for transmission over the optical fiber 306, in accordance with PON standards.

Further, during the UL data transmission, the PON component 302b is configured to receive the optical signal comprising the UL data from the network component 304, over the optical fiber 306. In such embodiments, the PON component 302b is configured to convert (e.g., demodulate), via the one or more processors, the optical signal comprising the UL data into DOCSIS data packets in accordance with PON standards and provide the DOCSIS data packets to the core component 302a over the Ethernet interface 302c.

Upon receiving the DOCSIS data packets, the core component 302a is configured to process the DOCSIS data packets in compliance with DOCSIS. That is, in such embodiments, the PON component 302b performs network functions comprising the physical layer processing associated with the UL data (e.g., demodulation) utilizing standard PON technologies and the core component 302a performs the network functions comprising the layer 2 (or upper layers) processing associated with the UL data in accordance with DOCSIS.

Figure 4:
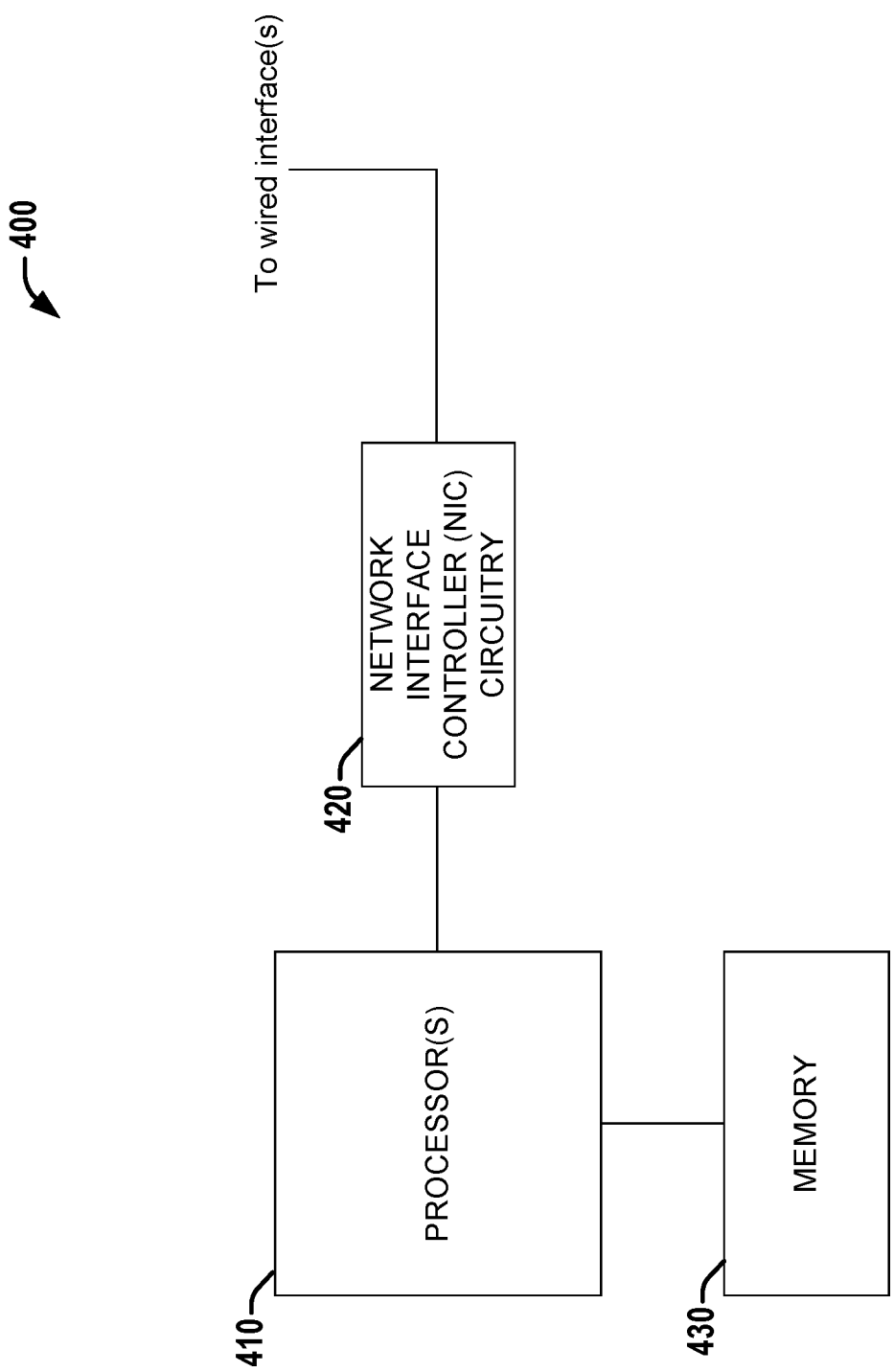
FIG. 4 illustrates a block diagram of an apparatus included within a core component of a core system in a passive optical network (PON), according to various aspects described herein.

Referring to FIG. 4, illustrated is a block diagram of an apparatus 400 included within a core component of a core system in a passive optical network (PON), according to various aspects described herein. The apparatus 400 is explained herein with respect to the core component 202a of the core system 202 in the PON 200 in FIG. 2 in a first embodiment and with respect to the core component 302a of the core system 302 in the PON 300 in FIG. 3 in a second embodiment. The apparatus 400 include a processor 410, optional network interface controller (NIC) circuitry 420 (which can facilitate communication of data via one or more networks in some aspects), and a memory 430 (which can comprise any of a variety of storage mediums and can store instructions and/or data associated with at least one of the processor 410 or NIC circuitry 420). In some aspects, the processor 410, the NIC circuitry 420, and the memory 430 can be included in a single device, while in other aspects, they can be included in different devices, such as part of a distributed network. In some embodiments, the processor 410 can include one or more processors. As described in greater detail below, apparatus 400 can facilitate to utilize DOCSIS over PON.

In the first embodiment, during downlink (DL) data transmission, when DL data is available at a core system (e.g. the core system 202 in FIG. 2), the processor 410 is configured to generate DOCSIS data packets based on the DL data, in compliance with DOCSIS. The processor 410 is further configured to convert the generated DOCSIS data packets into optical signals (e.g., the optical signal 207 in FIG. 2) based on PON standards and provide the optical signals, via the NIC circuitry 420, to a network component (e.g., the network component 204 in FIG. 2) over an optical fiber (e.g., the optical fiber 206 in FIG. 2). In some embodiments, the NIC circuitry 420 comprises an output terminal associated with the core system 202 in FIG. 2 or the core component 202a in FIG. 2 that is configured to couple to the network component 204 in FIG. 2 over the optical fiber 206 in FIG. 2. In some embodiments, the generation of DOCSIS data packets in compliance with DOCSIS is performed in accordance with instructions and data stored in the memory 430.

Similarly, during UL data transmission, when optical signals comprising UL data is provided to the core system (e.g., the core system 202 in FIG. 2) by the network component (e.g., the network component 204 in FIG. 2), the processor 410 is configured to receive the optical signal comprising the UL data, via the NIC circuitry 420, from the network component. The processor 410 is further configured to convert the optical signals into DOCSIS data packets (i.e., demodulation), in accordance with PON standards. Furthermore, the processor 410 is configured to process the DOCSIS data packets in compliance with DOCSIS. In some embodiments, the processing of the DOCSIS data packets in compliance with DOCSIS is performed in accordance with instructions and data stored in the memory 430.

In the second embodiment, during downlink (DL) data transmission, when DL data is available at a core system (e.g. the core system 300 in FIG. 3), the processor 410 is configured to generate DOCSIS data packets based on the DL data, in compliance with DOCSIS. In some embodiments, the generation of DOCSIS data packets in compliance with DOCSIS is performed in accordance with instructions and data stored in the memory 430. The processor 410 is further configured to provide the DOCSIS data packets, via the NIC circuitry 420, to a PON component (e.g., the PON component 302b in FIG. 3) over an Ethernet interface (e.g., the Ethernet interface 302c in FIG. 3), via tunneling. In some embodiments, the NIC circuitry 420 comprises an output terminal associated with the core component 302a in FIG. 3 that is configured to couple to the PON component 302b in FIG. 3 over the Ethernet interface 302c in FIG. 3.

Similarly, during UL data transmission, when DOCSIS data packets comprising UL data is provided to the core component (e.g., the core component 302a in FIG. 3) by the PON component (e.g., the PON component 302b in FIG. 3), the processor 410 is configured to receive the DOCSIS data packets comprising the UL data, via the NIC circuitry 420, from the PON component. The processor 410 is further configured to process the DOCSIS data packets in compliance with DOCSIS. In some embodiments, the processing of the DOCSIS data packets in compliance with DOCSIS is performed in accordance with instructions and data stored in the memory 430.

Figure 5:
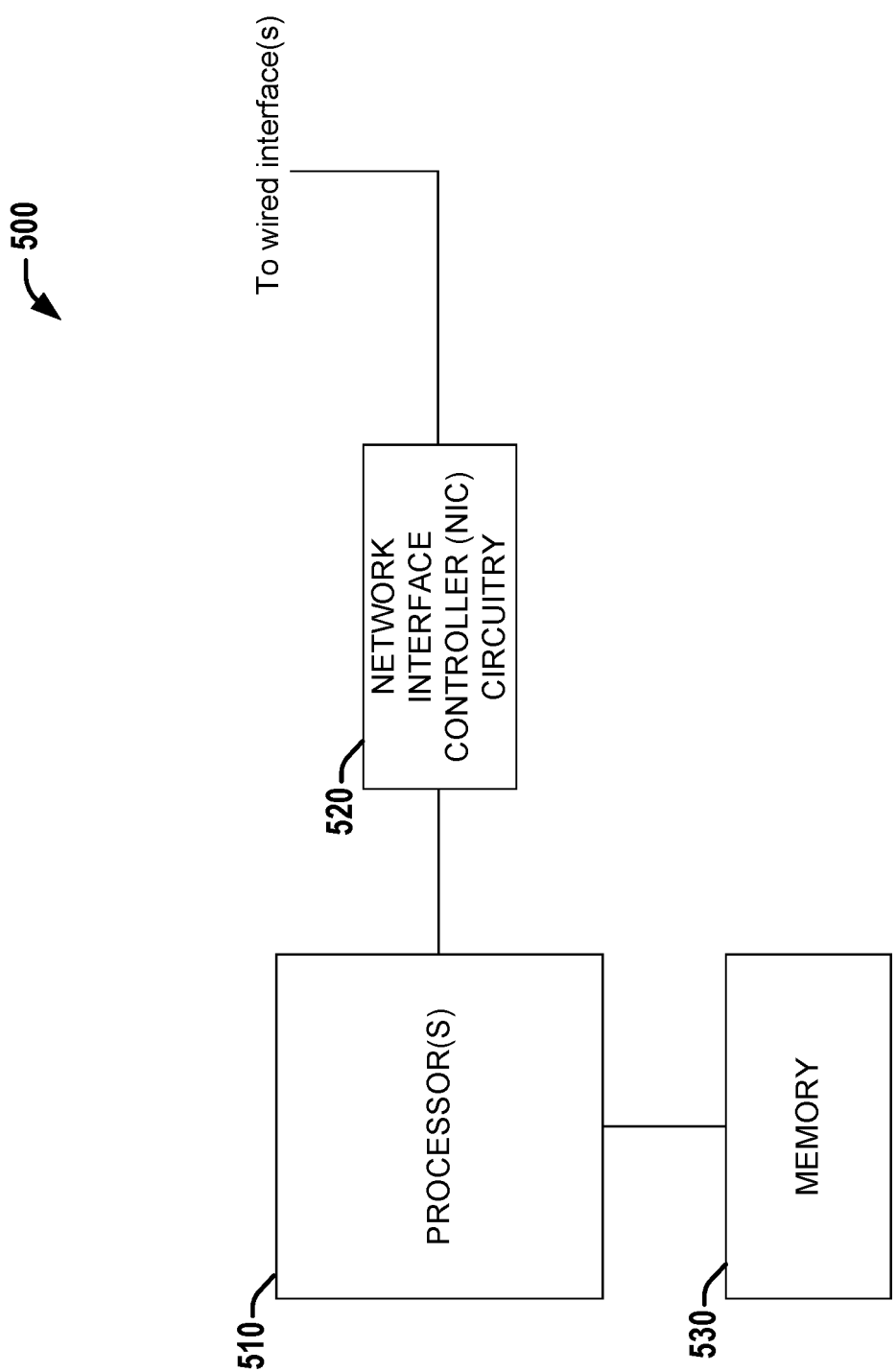
FIG. 5 illustrates a block diagram of an apparatus included within a PON component of a core system in a passive optical network (PON), according to various aspects described herein.

Referring to FIG. 5, illustrated is a block diagram of an apparatus 500 included within a PON component of a core system in a passive optical network (PON), according to various aspects described herein. The apparatus 500 is explained herein with respect to the PON component 302b of the core system 302 in the PON 300 in FIG. 3. The apparatus 500 include a processor 510, optional network interface controller (NIC) circuitry 520 (which can facilitate communication of data via one or more networks in some aspects), and a memory 530 (which can comprise any of a variety of storage mediums and can store instructions and/or data associated with at least one of the processor 510 or NIC circuitry 520). In some aspects, the processor 510, the NIC circuitry 520, and the memory 530 can be included in a single device, while in other aspects, they can be included in different devices, such as part of a distributed network. In some embodiments, the processor 510 can include one or more processors. As described in greater detail below, apparatus 500 can facilitate to utilize DOCSIS over PON.

During downlink (DL) data transmission, when DL data is available at a core system (e.g. the core system 300 in FIG. 3), the processor 510 is configured to receive DOCSIS data packets based on the DL data from a core component (e.g., the core component 302a in FIG. 3), via the NIC circuitry 520. In some embodiments, the DOCSIS data packets are generated at the core component in compliance with DOCSIS. Upon receiving the DOCSIS data packets, the processor 510 is configured to process the DOCSIS data packets in accordance with PON standards. In some embodiments, processing the DOCSIS data packets comprises physical layer processing including converting the DOCSIS data packets into optical signals (e.g., the optical signal 307).

In some embodiments, the conversion of DOCSIS data packets into optical signals is performed in accordance with instructions stored in the memory 530. In some embodiments, the processor 510 is further configured to provide the optical signals to a network component (e.g., the network component 304 in FIG. 3) over an optical fiber (e.g., the optical fiber 306 in FIG. 3), via the NIC circuitry 520. In some embodiments, the NIC circuitry 520 comprises an input terminal associated with the PON component 302b in FIG. 3 that is configured to couple to the core component 302a over the Ethernet interface 302c. Alternately, in other embodiments, the NIC circuitry 520 comprises an output terminal associated with the PON component 302b in FIG. 3 that is configured to couple to the network component 304 in FIG. 3 over the optical fiber 306 in FIG. 3.

Similarly, during uplink (UL) data transmission, when optical signals comprising UL data is provided to the core system (e.g., the core system 302 in FIG. 3) by the network component (e.g., the network component 304 in FIG. 3), the processor 510 is configured to receive the optical signal comprising the UL data, via the NIC circuitry 520, from the network component. The processor 510 is further configured to process the optical signals (i.e., physical layer processing), for example, convert the optical signals into DOCSIS data packets (i.e., demodulation), in accordance with PON standards. In some embodiments, the processor 510 is further configured to provide the DOCSIS data packets to a core component (e.g., the core component 302a in FIG. 3) over an Ethernet interface (e.g., the Ethernet interface 302c in FIG. 3), via the NIC circuitry 520.

Figure 6:
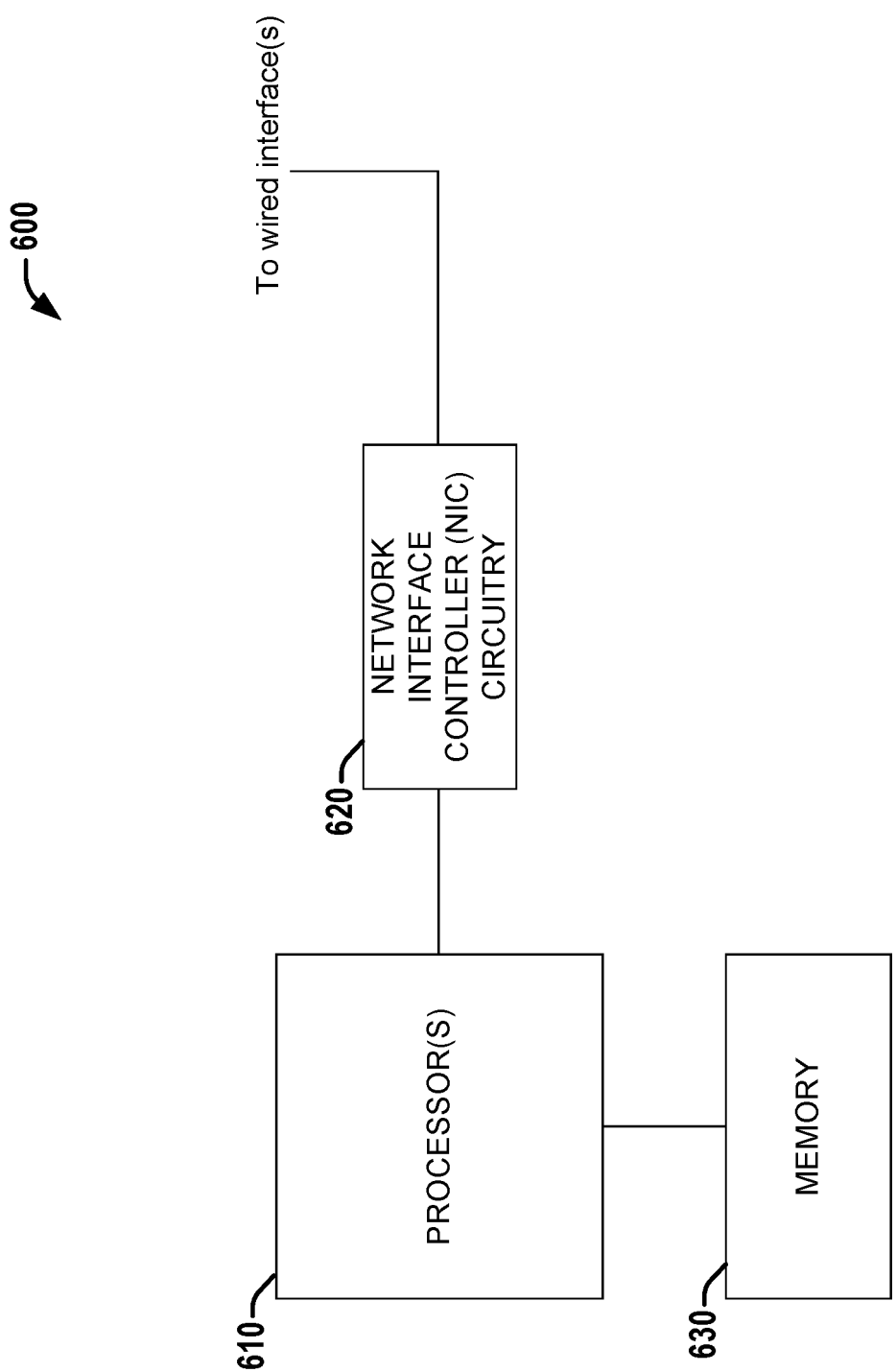
FIG. 6 illustrates a block diagram of an apparatus included within a network component in a passive optical network (PON), according to various aspects described herein.

Referring to FIG. 6, illustrated is a block diagram of an apparatus 600 included within a network component in a passive optical network (PON), according to various aspects described herein. The apparatus 600 is explained herein with respect to the network component 204 in the PON 200 in FIG. 2 and with respect to the network component 304 in the PON 300 in FIG. 3. The apparatus 600 include a processor 610, optional network interface controller (NIC) circuitry 620 (which can facilitate communication of data via one or more networks in some aspects), and a memory 630 (which can comprise any of a variety of storage mediums and can store instructions and/or data associated with at least one of the processor 610 or NIC circuitry 620). In some aspects, the processor 610, the NIC circuitry 620, and the memory 630 can be included in a single device, while in other aspects, they can be included in different devices, such as part of a distributed network. In some embodiments, the processor 610 can include one or more processors. As described in greater detail below, apparatus 600 can facilitate to utilize DOCSIS over PON.

During downlink (DL) data transmission, when DL data is available at a core system (e.g. the core system 200 in FIG. 2 or the core system 300 in FIG. 3), the processor 610 is configured to receive optical signals comprising DL data (e.g., the optical signal 207 in FIG. 2 or the optical signal 307 in FIG. 3), via the NIC circuitry 620. In some embodiments, the optical signal is received at the processor 610 from a core component (e.g., the core component 202a in FIG. 2) in a PON, whereas in other embodiments, the optical signal is received at the processor 610 from a PON component (e.g., the PON component 302b in FIG. 3) in a PON. Upon receiving the optical signal, the processor 610 is configured to process the optical signal (i.e., physical layer processing), for example, convert the optical signal into DOCSIS data packets (i.e., demodulate), in accordance with PON standards. In addition, the processor 610 is configured to process the DOCSIS data packets in compliance with DOCSIS. In some embodiments, the processing of the optical signal and the DOCSIS data packets is done in accordance with the instructions stored in the memory 630. In some embodiments, the NIC circuitry 620 comprises an input terminal associated with the network component 204 in FIG. 2 that is configured to couple to the core component 202a over the optical fiber 206. Alternately, in other embodiments, the NIC circuitry 620 comprises an input terminal associated with the network component 304 in FIG. 3 that is configured to couple to the PON component 302*b* over the optical fiber 306.

During UL data transmission, when UL data is available at the network component, the processor 610 is configured to generate DOCSIS data packets based on the UL data in accordance with DOCSIS. The processor 610 is further configured to convert the DOCSIS data packets into optical signals based on PON standards. In some embodiments, generating the DOCSIS data packets and converting the DOCSIS data packets into optical signals are done in accordance with instructions stored in the memory 610. In some embodiments, the processor 610 is further configured to provide the optical signals over an optical fiber, via the NIC circuitry 620. In some embodiments, the optical signals are provided to a core component (e.g., the core component 202*a* in FIG. 2), whereas in other embodiments, the optical signals are provided to a PON component (e.g., the PON component 302*b* in FIG. 3).

Figure 7:
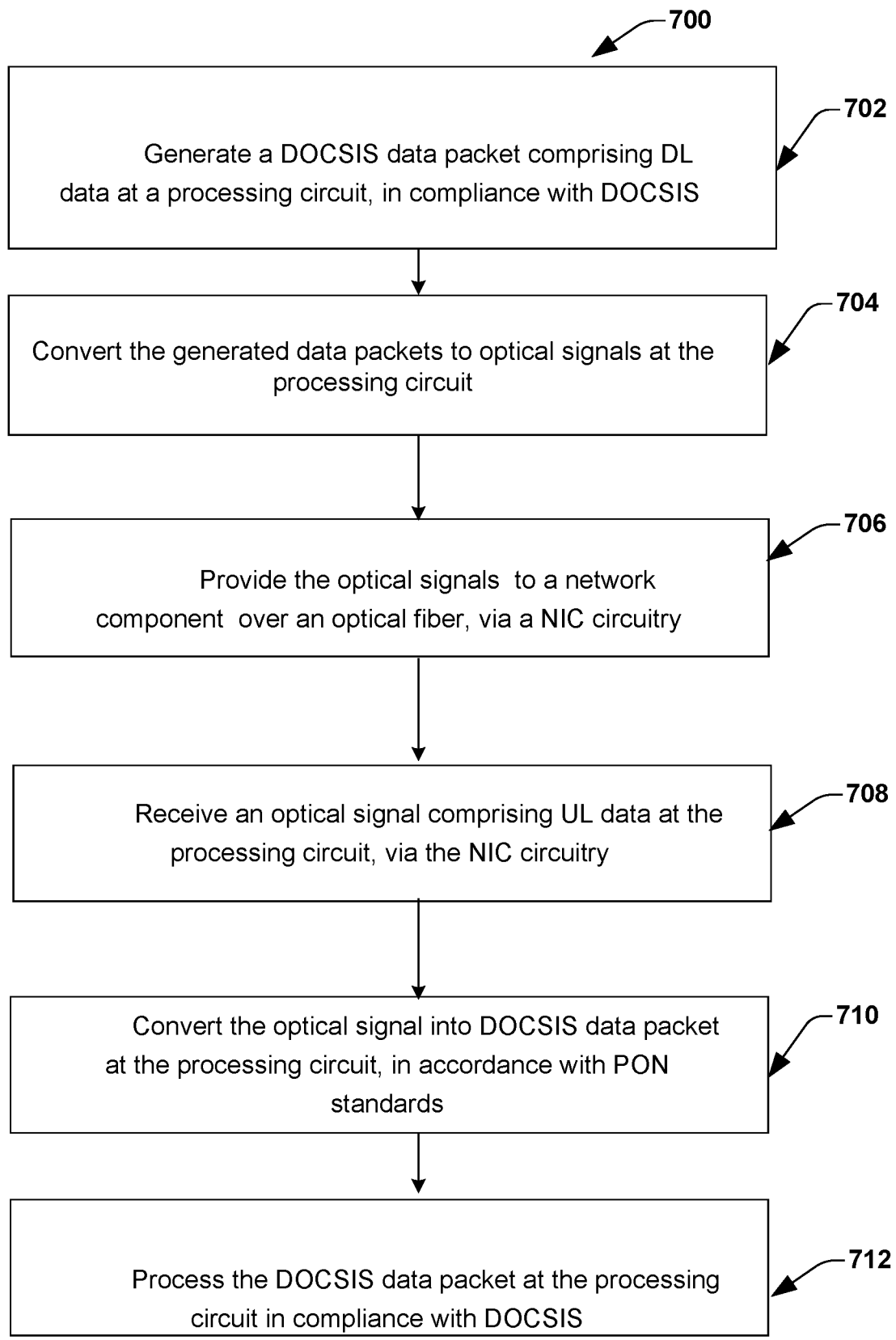
FIG. 7 illustrates a flow chart of a method for a core component in passive optical networks, according to one embodiment of the disclosure.

FIG. 7 illustrates a flow chart of a method 700 for a core component in passive optical networks, according to one embodiment of the disclosure. The method 700 is explained herein with reference to the apparatus 400 in FIG. 4. In some embodiments, the apparatus 400 could be included within the core component 202*a* in the PON 200 in FIG. 2. At 702, a DOCSIS data packet comprising DL data is generated at the processing circuit 410, in compliance with DOCSIS. At, 704, the generated data packets are converted to optical signals at the processing circuit 410. In some embodiments, generating the DOCSIS data packets and converting the DOCSIS data packets into optical signals are performed at the processing circuit 410, in accordance with instructions stored in the memory 430. At 706, the optical signals are provided by the processing circuit 410 to a network component (e.g., the network component 204 in FIG. 2) over an optical fiber, via the NIC circuitry 420. At 708, an optical signal comprising UL data is received at the processing circuit 410, via the NIC circuitry 420. At 710, the optical signal is converted into DOCSIS data packet at the processing circuit 410, in accordance with PON standards. At 712, the DOCSIS data packet is processed at the processing circuit 410 in compliance with DOCSIS. In some embodiments, converting the optical signals into DOCSIS data packets and processing the DOCSIS data packets are performed at the processing circuit 410, in accordance with instructions stored in the memory 430.

Figure 8:
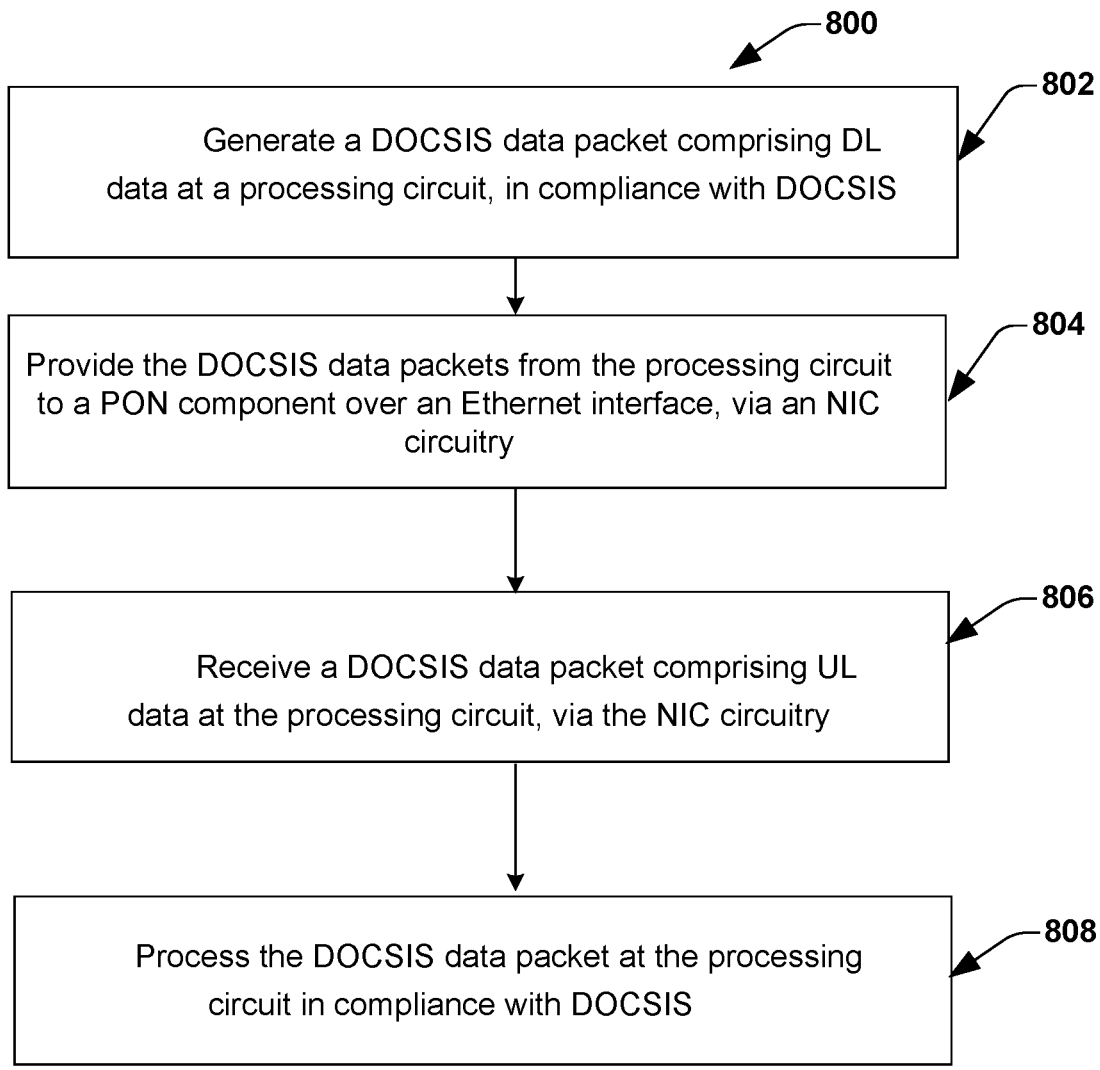
FIG. 8 illustrates a flow chart of a method for a core component in passive optical networks, according to another embodiment of the disclosure.

FIG. 8 illustrates a flow chart of a method 800 for a core component in passive optical networks, according to another embodiment of the disclosure. The method 800 is explained herein with reference to the apparatus 400 in FIG. 4. In some embodiments, the apparatus 400 could be included within the core component 302*a* in the PON 300 in FIG. 3. At 802, a DOCSIS data packet comprising DL data is generated at the processing circuit 410, in compliance with DOCSIS. In some embodiments, generating the DOCSIS data packets is performed at the processing circuit 410, in accordance with instructions stored in the memory 430. At 804, the DOCSIS data packets are provided by the processing circuit 410 to a PON component (e.g., the PON component 302*b* in FIG. 3) over an Ethernet interface (e.g., the Ethernet interface 302*c* in FIG. 3), via the NIC circuitry 420. At 806, a DOCSIS data packet comprising UL data is received at the processing circuit 410, via the NIC circuitry 420. At 808, the DOCSIS data packet is processed at the processing circuit 410 in compliance with DOCSIS. In some embodiments, processing the DOCSIS data packets is performed at the processing circuit 410, in accordance with instructions stored in the memory 430.

Figure 9:
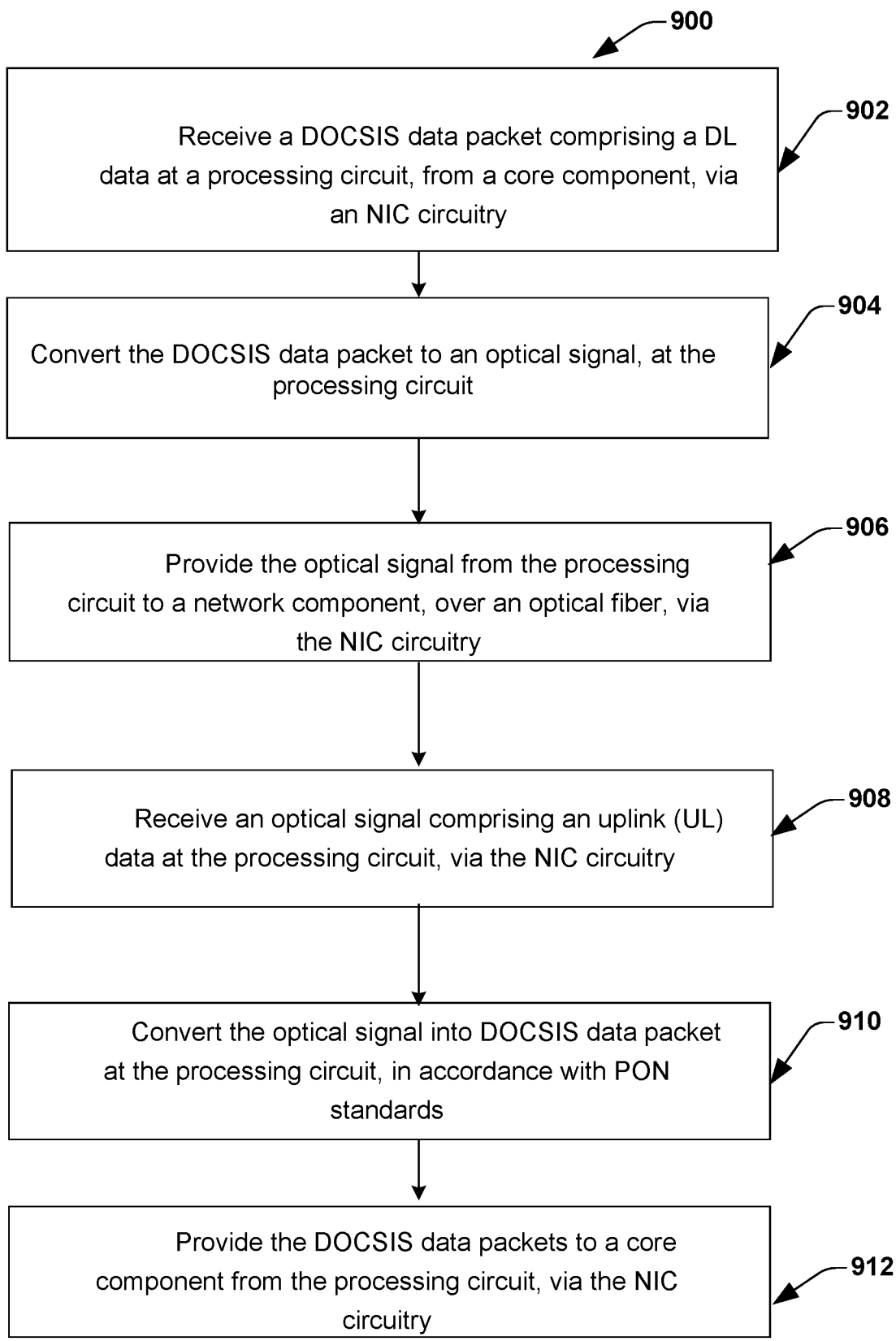
FIG. 9 illustrates a flow chart of a method for a PON component in passive optical networks, according to one embodiment of the disclosure.

FIG. 9 illustrates a flow chart of a method 900 for a PON component in passive optical networks, according to one embodiment of the disclosure. The method 900 is explained herein with reference to the apparatus 500 in FIG. 5. In some embodiments, the apparatus 500 could be included within the PON component 302*b* in the PON 300 in FIG. 3. At 902, a DOCSIS data packet comprising a DL data is received at the processing circuit 510, from a core component (e.g., the core component 302*a* in FIG. 3), via the NIC circuitry 520. At 904, the DOCSIS data packet is converted to an optical signal, at the processing circuit 510. In some embodiments, converting the DOCSIS data packet into optical signal is performed at the processing circuit 510, in accordance with instructions stored in the memory 530. At 906, the optical signal is provided by the processing circuit 510 to a network component (e.g., the network component 304 in FIG. 3), over an optical fiber, via the NIC circuitry 520. At 908, an optical signal comprising an uplink (UL) data is received at the processing circuit 510, via the NIC circuitry 520. At 910, the optical signal comprising the UL data is converted into DOCSIS data packets at the processing circuit 510, in accordance with PON standards. In some embodiments, converting the optical signal into DOCSIS data packets is performed at the processing circuit 510, in accordance with instructions stored in the memory 530. At 912, the DOCSIS data packets are provided to a core component (e.g., the core component 302*a* in FIG. 3) from the processing circuit 510, via the NIC circuitry 520.

Figure 10:
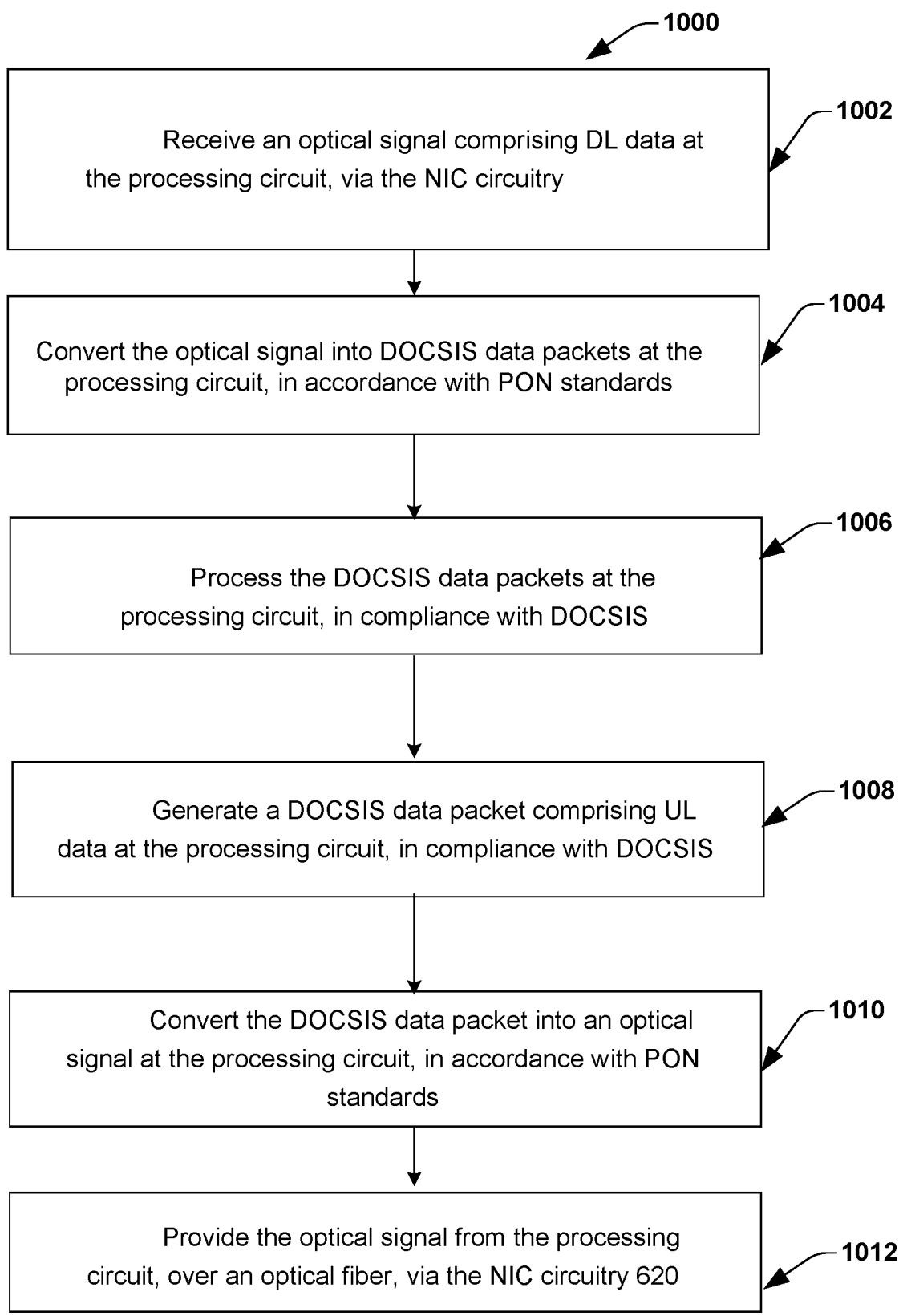
FIG. 10 illustrates a flow chart of a method for a network component in passive optical networks, according to one embodiment of the disclosure.

FIG. 10 illustrates a flow chart of a method 1000 for a network component in passive optical networks, according to one embodiment of the disclosure. The method 1000 is explained herein with reference to the apparatus 600 in FIG. 6. In some embodiments, the apparatus 600 could be included within the network component 204 in FIG. 2 or the network component 304 in FIG. 3. At 1002, an optical signal comprising DL data is received at the processing circuit 610, via the NIC circuitry 620. In some embodiments, the optical signal is received at the processing circuit 610 from a core component (e.g., the core component 202*a* in FIG. 2), whereas in other embodiments, the optical signal is received at the processing circuit 610 from a PON component (e.g., the PON component 302*b* in FIG. 3). At 1004, the optical signal is converted into DOCSIS data packets at the processing circuit 610, in accordance with PON standards.

At 1006, the DOCSIS data packets are processed at the processing circuit 610, in compliance with DOCSIS. In some embodiments, converting the optical signal into DOCSIS data packets and processing the DOCSIS data packet are performed at the processing circuit 610, in accordance with instructions stored in the memory 630. At 1008, a DOCSIS data packet comprising UL data is generated at the processing circuit 610, in compliance with DOCSIS. At 1010, the DOCSIS data packet is converted into an optical signal at the processing circuit 610, in accordance with PON standards. In some embodiments, generating the DOCSIS data packet and converting the DOCSIS data packet into the optical signal are performed at the processing circuit 610, in accordance with instructions stored in the memory 630. At 1012, the optical signal is provided by the processing circuit, over an optical fiber, via the NIC circuitry 620. In some embodiments, the optical signal is provided to a core component (e.g., the core component 202*a* in FIG. 2), whereas in other embodiments, the optical signal is provided to a PON component (e.g., the PON component 302*b* in FIG. 3).

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Figure 11:
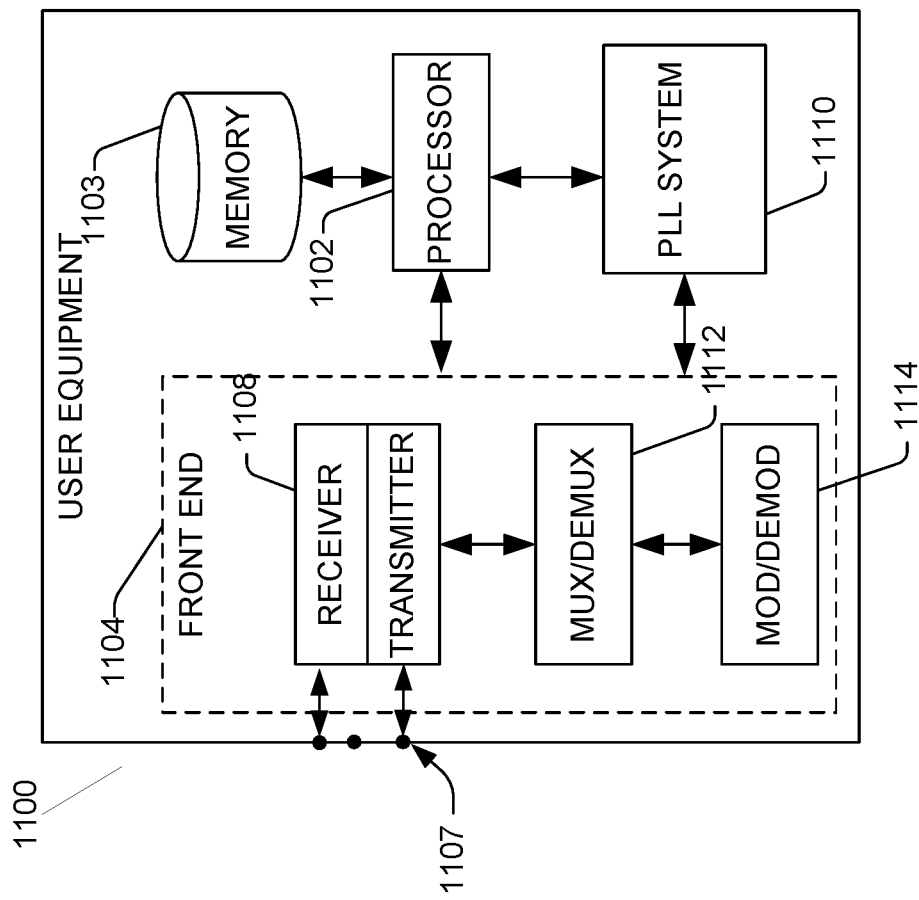
FIG. 11 illustrates an example device, according to the various aspects of the disclosure.

To provide further context for various aspects of the disclosed subject matter, FIG. 11 illustrates a block diagram of an embodiment of device 1100 (e.g., cable modem or gateway, etc.) related to access of a network (e.g., base station, wireless access point, femtocell access point, and so forth) that can enable and/or exploit features or aspects of the disclosed aspects.

The device 1100 can be utilized with one or more aspects (e.g., the core component, the PON component or the network component in FIG. 2 or FIG. 3) of passive optical networks described herein according to various aspects. The user device 1100, for example, comprises a digital baseband processor 1102 that can be coupled to a data store or memory 1103 and a front end 1104 (e.g., an RF front end, an acoustic front end, or the other like front end). The device 1100 further comprises one or more input/output ports 1107 configured to receive and transmit signals to and from one or more devices such as access points, access terminals, wireless ports, routers and so forth, which can operate within a radio access network or other communication network generated via a network device (not shown).

The device 1100 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 1104 can include a communication platform, which comprises electronic components and associated circuitry that provide for processing, manipulation or shaping of the received or transmitted signals via one or more receivers or transmitters (e.g. transceivers) 1108, a mux/demux component 1112, and a mod/demod component 1114. The front end 1104 is coupled to the digital baseband processor 1102 and the set of input/output ports 1107. The front end 1104 may be configured to perform the remodulation techniques described herein to extend the frequency range of the device 1100. In one aspect, the user equipment device 1100 can comprise a phase locked loop system 1110.

The processor 1102 can confer functionality, at least in part, to substantially any electronic component within the mobile communication device 1100, in accordance with aspects of the disclosure. As an example, the processor 1102 can be configured to execute, at least in part, executable instructions that cause the front end to remodulate signals to selected frequencies. The processor 1102 is functionally and/or communicatively coupled (e.g., through a memory bus) to memory 1103 in order to store or retrieve information necessary to operate and confer functionality, at least in part, to communication platform or front end 1104, the phase locked loop system 1110 and substantially any other operational aspects of the phase locked loop system 1110. The phase locked loop system 1110 includes at least one oscillator (e.g., a VCO, DCO or the like) that can be calibrated via core voltage, a coarse tuning value, signal, word or selection process.

The processor 1102 can operate to enable the mobile communication device 1100 to process data (e.g., symbols, bits, or chips) for multiplexing/demultiplexing with the mux/demux component 1112, or modulation/demodulation via the mod/demod component 1114, such as implementing direct and inverse fast Fourier transforms, selection of modulation rates, selection of data packet formats, interpacket times, etc. Memory 1103 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is core system in a passive optical network (PON), comprising one or more processors; and a memory including instructions comprising operations, for execution via the one or more processors, to generate a downlink (DL) data stream comprising optical signals, in compliance with a data over cable service interface specification (DOCSIS); and provide the optical signals containing DL data to an output terminal associated therewith that is configured to couple to a network component in the PON over an optical fiber coupled between the core system and the network component.

Example 2 is a core system, including the subject matter of example 1, further comprising a core component configured to perform network functions comprising media access control (MAC) and upper layer processing associated with the DL data, wherein the network functions includes generating DOCSIS data packets based on the DL data, via the one or more processors, utilizing the MAC and upper layer protocols in DOCSIS.

Example 3 is a core system, including the subject matter of examples 1-2, including or omitting elements, further comprising a PON component coupled to the core component, and configured to perform network functions comprising physical layer processing associated with the DL data, wherein the network functions includes receiving the generated DOCSIS data packets from the core component over an interface between the core component and the PON component and converting, via the one or more processors, the received DOCSIS data packets into the DL data stream comprising the optical signals, utilizing PON standards.

Example 4 is a core system, including the subject matter of examples 1-3, including or omitting elements, wherein the PON component is further configured to receive an uplink (UL) data stream comprising optical signals comprising a UL data from an output terminal associated therewith that is configured to couple to the network component, and perform network functions comprising physical layer processing associated with the UL data, wherein the network functions include converting the optical signals comprising the UL data into DOCSIS data packets, utilizing the PON standards and providing the DOCSIS data packets to an input terminal associated therewith that is configured to couple to the core component over the interface between the core component and the PON component.

Example 5 is a core system, including the subject matter of examples 1-4, including or omitting elements, wherein the core component is further configured to receive the DOCSIS data packets comprising the UL data from an output terminal associated therewith that is configured to couple to the PON component, and perform network functions comprising the MAC and upper layer processing associated with the UL data, wherein the network functions includes processing the DOCSIS data packets, utilizing, via the one or more processors, the media access control (MAC) and upper layer protocols in DOCSIS.

Example 6 is a core system, including the subject matter of examples 1-5, including or omitting elements, wherein the interface between the core component and the PON component comprises an Ethernet interface.

Example 7 is a core system, including the subject matter of examples 1-6, including or omitting elements, further comprising a core component comprising the one or more processors, configured to perform network functions comprising media access control (MAC) and upper layer processing associated with the DL data, wherein the network functions includes generating DOCSIS data packets based on the DL data, utilizing, via the one or more processors, media access control (MAC) and upper layer protocols in DOCSIS, and perform network functions comprising physical layer processing associated with the DL data, wherein the network functions include converting the DOCSIS data packets into the DL data stream comprising the optical signals, utilizing PON standards.

Example 8 is a core system, including the subject matter of examples 1-7, including or omitting elements, wherein the core component is further configured to process an uplink (UL) data stream comprising optical signals, received from an output terminal associated therewith that is configured to couple to the network component, in compliance with the DOCSIS.

Example 9 is a core system, including the subject matter of examples 1-8, including or omitting elements, wherein processing the uplink data stream comprises performing network functions comprising physical layer processing associated with the UL data, wherein the network functions includes converting, via the one or more processors, the optical signals in the UL data stream into DOCSIS data packets, utilizing PON standards; and performing network functions comprising media access control (MAC) and upper layer processing associated with the UL data, wherein the network functions includes processing the DOCSIS data packets, utilizing, via the one or more processors, the media access control (MAC) and upper layer protocols in DOCSIS.

Example 10 is a core system, including the subject matter of examples 1-9, including or omitting elements, wherein the network functions associated with the core component is virtualized.

Example 11 is a core system, including the subject matter of examples 1-10, including or omitting elements, wherein the core component is located at a headend equipment of the PON and the PON component is located at a street node of the PON.

Example 12 is a passive optical network (PON) component in a passive optical network (PON), comprising one or more processors; and a memory including instructions comprising operations, for execution via the one or more processors, to receive a downlink (DL) data stream comprising data over cable service interface specification (DOCSIS) data packets comprising DL data from an input terminal associated therewith that is configured to couple to a core component in the PON over an interface between the PON component and the core component; perform network functions comprising physical layer processing associated with the DL data, wherein the network functions include generating an optical signal comprising the DL data based on the received DOCSIS data packets, utilizing PON standards; and provide the generated optical signal comprising the DL data to an output terminal associated therewith that is configured to couple to a network component in the PON over an optical fiber coupled between the PON component and the network component.

Example 13 is a PON component, including the subject matter of example 12, wherein the one or more processors is further configured to receive an uplink (UL) data stream comprising an optical signal comprising a UL data from the output terminal associated therewith that is configured to couple to the network component, over the optical fiber coupled between the PON component and the network component; perform network functions comprising physical layer processing associated with the UL data, wherein the network functions include converting the optical signal comprising the UL data to DOCSIS data packets, utilizing PON standards; and provide the DOCSIS data packets to the input terminal associated therewith that is configured to couple to the core component, over the interface between the PON component and the core component.

Example 14 is a PON component, including the subject matter of examples 12-13, including or omitting elements, wherein the DOCSIS data packets are generated at the core component in compliance with DOCSIS.

Example 15 is a PON component, including the subject matter of examples 12-14, including or omitting elements, wherein the interface between the PON component and the core component comprises an Ethernet interface.

Example 16 is a network component in a passive optical network (PON), comprising one or more processors; and a memory including instructions comprising operations, for execution via the one or more processors, to receive a downlink (DL) data stream comprising an optical signal comprising a DL data from an input terminal associated therewith that is configured to couple to a core system in the PON, over an optical fiber coupled between the core system and the network component; perform network functions comprising physical layer processing associated with the DL data, wherein the network functions include converting the received optical signal comprising the DL data into data over cable service interface specification (DOCSIS) data packets, utilizing PON standards; and perform network functions comprising media access control (MAC) and upper layer processing associated with the DL data, wherein the network functions includes processing the DOCSIS data packets, in compliance with DOCSIS.

Example 17 is a network component, including the subject matter of example 16, wherein the input terminal is configured to couple to a core component in the core system, over an optical fiber coupled between the core component and the network component.

Example 18 is a network component, including the subject matter of examples 16-17, including or omitting elements, wherein the one or more processors is further configured to perform network functions comprising MAC and upper layer processing associated with UL data, wherein the network functions include generating an uplink (UL) data stream comprising DOCSIS data packets comprising the UL data, in compliance with media access control (MAC) and upper layer protocols in DOCSIS; perform network functions comprising physical layer processing associated with the UL data, wherein the network functions include converting the generated DOCSIS data packets into an optical signal comprising the UL data; and provide the optical signal comprising the UL data to the input terminal that is configured to couple to the core component over the optical fiber coupled between the core component and the network component.

Example 19 is a network component, including the subject matter of examples 16-18, including or omitting elements, wherein the input terminal is configured to couple to a PON component in the core system in the PON, over an optical fiber coupled between the PON component and the network component.

Example 20 is a network component, including the subject matter of examples 16-19, including or omitting elements, wherein the one or more processors is further configured to perform network functions comprising MAC and upper layer processing associated with UL data, wherein the network functions include generating an uplink (UL) data stream comprising DOCSIS data packets comprising the UL data, in compliance with media access control (MAC) and upper layer protocols in DOCSIS; perform network functions comprising physical layer processing associated with the UL data, wherein the network functions include convert the generated DOCSIS data packets into an optical signal comprising the UL data; and provide the optical signal comprising the UL data to the input terminal that is configured to couple to the PON component over the optical fiber coupled between the PON component and the network component.

Example 21 is a method for a core system in a passive optical network (PON), comprising generating using one or more processors, a downlink (DL) data stream comprising optical signals, in compliance with a data over cable service interface specification (DOCSIS); and providing by the one or more processors, the optical signals containing DL data to an output terminal associated therewith that is configured to couple to a network component in the PON over an optical fiber coupled between the core system and the network component.

Example 22 is a method, including the subject matter of example 21, further comprising performing network functions comprising media access control (MAC) and upper layer processing associated with the DL data by a core component within the core system, wherein the network functions includes generating DOCSIS data packets based on the DL data, via the one or more processors, utilizing the MAC and upper layer protocols in DOCSIS.

Example 23 is a method, including the subject matter of examples 21-22, including or omitting elements, further comprising performing network functions comprising physical layer processing associated with the DL data by a PON component coupled to the core component, within the core system, wherein the network functions includes receiving the generated DOCSIS data packets from the core component over an interface between the core component and the PON component and converting, via the one or more processors, the received DOCSIS data packets into the DL data stream comprising the optical signals, utilizing PON standards.

Example 24 is a method, including the subject matter of examples 21-23, including or omitting elements, further comprising receiving, at the PON component, an uplink (UL) data stream comprising optical signals comprising a UL data from an output terminal associated therewith that is configured to couple to the network component, and performing network functions comprising physical layer processing associated with the UL data, wherein the network functions include converting the optical signals comprising the UL data into DOCSIS data packets, utilizing the PON standards and providing the DOCSIS data packets to an input terminal associated therewith that is configured to couple to the core component over the interface between the core component and the PON component.

Example 25 is a method, including the subject matter of examples 21-24, including or omitting elements, further comprising receiving, by the core component, the DOCSIS data packets comprising the UL data from an output terminal associated therewith that is configured to couple to the PON component, and performing network functions comprising the MAC and upper layer processing associated with the UL data, wherein the network functions includes processing the DOCSIS data packets, utilizing, via the one or more processors, the media access control (MAC) and upper layer protocols in DOCSIS.

Example 26 is a method, including the subject matter of examples 21-25, including or omitting elements, wherein the interface between the core component and the PON component comprises an Ethernet interface.

Example 27 is a method, including the subject matter of examples 21-26, including or omitting elements, further comprising performing by a core component within the core system, via the one or more processors, network functions comprising media access control (MAC) and upper layer processing associated with the DL data, wherein the network functions includes generating DOCSIS data packets based on the DL data, utilizing, via the one or more processors, media access control (MAC) and upper layer protocols in DOCSIS, and performing by the core component, network functions comprising physical layer processing associated with the DL data, wherein the network functions include converting the DOCSIS data packets into the DL data stream comprising the optical signals, utilizing PON standards.

Example 28 is a method, including the subject matter of examples 21-27, including or omitting elements, further comprising processing by the core component, an uplink (UL) data stream comprising optical signals, received from an output terminal associated therewith that is configured to couple to the network component, in compliance with the DOCSIS.

Example 29 is a method, including the subject matter of examples 21-28, including or omitting elements, wherein processing the uplink data stream comprises performing via the one or more processors, network functions comprising physical layer processing associated with the UL data, wherein the network functions includes converting, via the one or more processors, the optical signals in the UL data stream into DOCSIS data packets, utilizing PON standards; and performing via the one or more processors, network functions comprising media access control (MAC) and upper layer processing associated with the UL data, wherein the network functions includes processing the DOCSIS data packets, utilizing, via the one or more processors, the media access control (MAC) and upper layer protocols in DOCSIS.

Example 30 is a method, including the subject matter of examples 21-29, including or omitting elements, wherein the network functions associated with the core component is virtualized.

Example 31 is a method, including the subject matter of examples 21-30, including or omitting elements, wherein the core component is located at a headend equipment of the PON and the PON component is located at a street node of the PON.

Example 32 is a method for a passive optical network (PON) component in a passive optical network (PON), comprising receiving, via one or more processors, a downlink (DL) data stream comprising data over cable service interface specification (DOCSIS) data packets comprising DL data from an input terminal associated therewith that is configured to couple to a core component in the PON over an interface between the PON component and the core component; performing, via the one or more processors, network functions comprising physical layer processing associated with the DL data, wherein the network functions include generating an optical signal comprising the DL data based on the received DOCSIS data packets, utilizing PON standards; and providing, by the one or more processors, the generated optical signal comprising the DL data to an output terminal associated therewith that is configured to couple to a network component in the PON over an optical fiber coupled between the PON component and the network component.

Example 33 is a method, including the subject matter of example 32, including or omitting elements, further comprising receiving, via the one or more processors, an uplink (UL) data stream comprising an optical signal comprising a UL data from the output terminal associated therewith that is configured to couple to the network component, over the optical fiber coupled between the PON component and the network component; performing, via the one or more processors, network functions comprising physical layer processing associated with the UL data, wherein the network functions include converting the optical signal comprising the UL data to DOCSIS data packets, utilizing PON standards; and providing, by the one or more processors, the DOCSIS data packets to the input terminal associated therewith that is configured to couple to the core component, over the interface between the PON component and the core component.

Example 34 is a method, including the subject matter of examples 32-33, including or omitting elements, wherein the DOCSIS data packets are generated at the core component in compliance with DOCSIS.

Example 35 is a method, including the subject matter of examples 32-34, including or omitting elements, wherein the interface between the PON component and the core component comprises an Ethernet interface.

Example 36 is a method for a network component in a passive optical network (PON), comprising receiving, via one or more processors, a downlink (DL) data stream comprising an optical signal comprising a DL data from an input terminal associated therewith that is configured to couple to a core system in the PON, over an optical fiber coupled between the core system and the network component; performing, via the one or more processors, network functions comprising physical layer processing associated with the DL data, wherein the network functions include converting the received optical signal comprising the DL data into data over cable service interface specification (DOCSIS) data packets, utilizing PON standards; and performing, via the one or more processors, network functions comprising media access control (MAC) and upper layer processing associated with the DL data, wherein the network functions includes processing the DOCSIS data packets, in compliance with DOCSIS.

Example 37 is a method, including the subject matter of example 36, wherein the input terminal is configured to couple to a core component in the core system, over an optical fiber coupled between the core component and the network component.

Example 38 is a method, including the subject matter of examples 36-37, including or omitting elements, further comprising performing, via the one or more processors, network functions comprising MAC and upper layer processing associated with UL data, wherein the network functions include generating an uplink (UL) data stream comprising DOCSIS data packets comprising the UL data, in compliance with media access control (MAC) and upper layer protocols in DOCSIS; performing, via the one or more processors, network functions comprising physical layer processing associated with the UL data, wherein the network functions include converting the generated DOCSIS data packets into an optical signal comprising the UL data; and providing, by the one or more processors, the optical signal comprising the UL data to the input terminal that is configured to couple to the core component over the optical fiber coupled between the core component and the network component.

Example 39 is a method, including the subject matter of examples 36-38, including or omitting elements, wherein the input terminal is configured to couple to a PON component in the core system in the PON, over an optical fiber coupled between the PON component and the network component.

Example 40 is a method, including the subject matter of examples 36-39, including or omitting elements, further comprising performing, via the one or more processors, network functions comprising MAC and upper layer processing associated with UL data, wherein the network functions include generating an uplink (UL) data stream comprising DOCSIS data packets comprising the UL data, in compliance with media access control (MAC) and upper layer protocols in DOCSIS; performing, via the one or more processors, network functions comprising physical layer processing associated with the UL data, wherein the network functions include convert the generated DOCSIS data packets into an optical signal comprising the UL data; and providing, by the one or more processors, the optical signal comprising the UL data to the input terminal that is configured to couple to the PON component over the optical fiber coupled between the PON component and the network component.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A core system in a passive optical network (PON), comprising:
    one or more processors;
    a memory including instructions comprising operations, for execution via the one or more processors, to:
        generate a downlink (DL) data stream comprising optical signals, in compliance with a data over cable service interface specification (DOCSIS); and
        provide the optical signals containing DL data to an output terminal associated therewith that is configured to couple to a network component in the PON over an optical fiber coupled between the core system and the network component;
    a core component configured to perform network functions comprising media access control (MAC) and upper layer processing associated with the DL data, wherein the network functions includes generating DOCSIS data packets based on the DL data, via the one or more processors, utilizing the MAC and upper layer protocols in DOCSIS; and
    a PON component coupled to the core component, and configured to perform network functions comprising physical layer processing associated with the DL data, wherein the network functions includes receiving the generated DOCSIS data packets from the core component over an interface between the core component and the PON component and converting, via the one or more processors, the received DOCSIS data packets into the DL data stream comprising the optical signals, utilizing PON standards.

2. The core system of claim 1, wherein the PON component is further configured to receive an uplink (UL) data stream comprising optical signals comprising a UL data from an output terminal associated therewith that is configured to couple to the network component, and perform network functions comprising physical layer processing associated with the UL data, wherein the network functions include converting the optical signals comprising the UL data into DOCSIS data packets, utilizing the PON standards and providing the DOCSIS data packets to an input terminal associated therewith that is configured to couple to the core component over the interface between the core component and the PON component.

3. The core system of claim 2, wherein the core component is further configured to receive the DOCSIS data packets comprising the UL data from an output terminal associated therewith that is configured to couple to the PON component, and perform network functions comprising the MAC and upper layer processing associated with the UL data, wherein the network functions includes processing the DOCSIS data packets, utilizing, via the one or more processors, the media access control (MAC) and upper layer protocols in DOCSIS.

4. The core system of claim 1, wherein the interface between the core component and the PON component comprises an Ethernet interface.

5. The core system of claim 1, wherein the network functions associated with the core component is virtualized.

6. The core system of claim 1, wherein the core component is located at a headend equipment of the PON and the PON component is located at a street node of the PON.

* * * * *